Patented July 31, 1923.

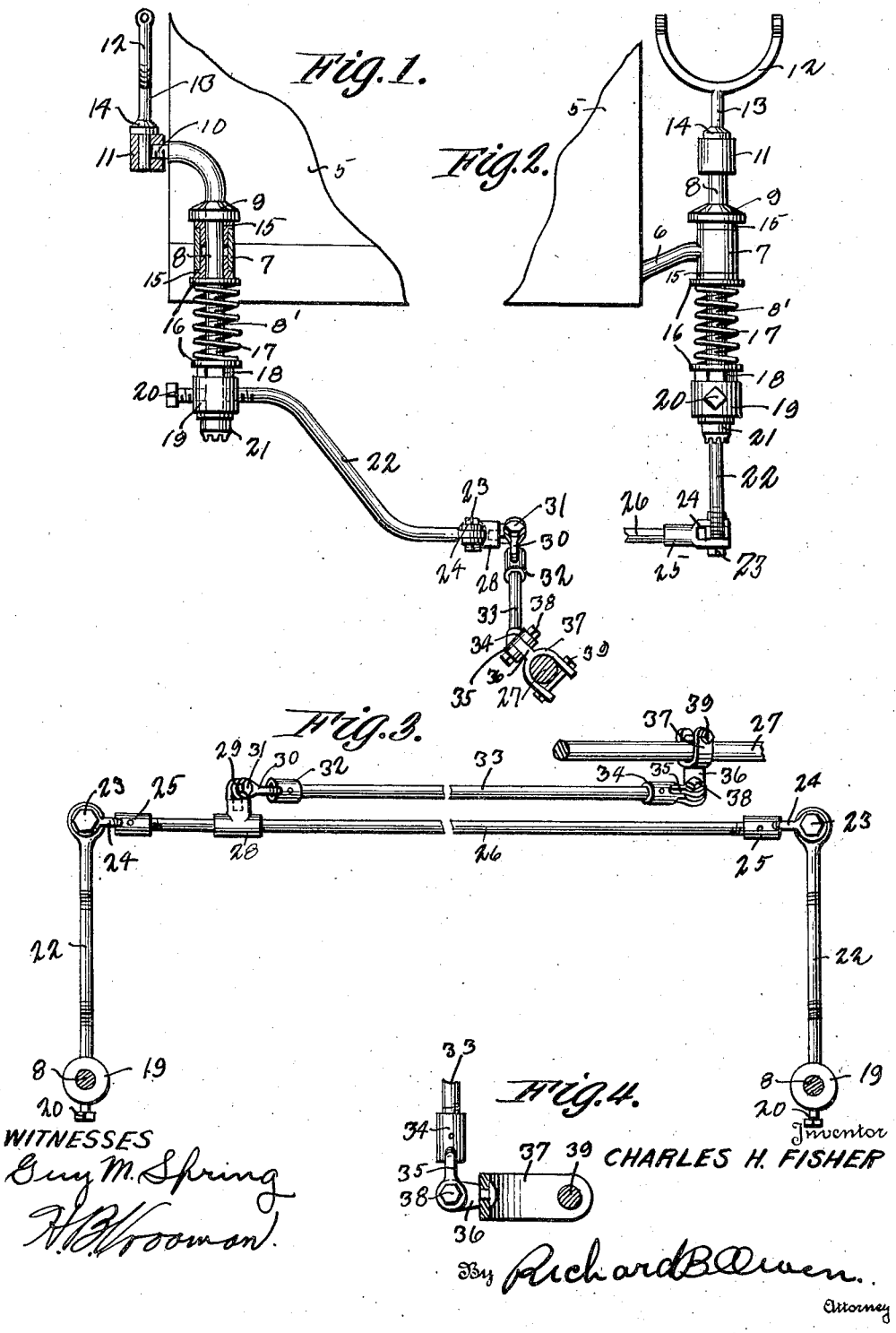

1,463,685

UNITED STATES PATENT OFFICE.

CHARLES H. FISHER, OF CARROLLTON, OHIO.

HEADLIGHT.

Application filed July 27, 1922. Serial No. 577,960.

*To all whom it may concern:*

Be it known that I, CHARLES H. FISHER, a citizen of the United States, residing at Carrollton, in the county of Carroll and State of Ohio, have invented certain new and useful Improvements in Headlights, of which the following is a specification.

This invention relates in general to motor vehicles and more particularly to a dirigible headlight having therefore its principal object the production of a means which will automatically turn the lamps as the course of the vehicle is changed, thus causing the rays of light projected from the lamps to be thrown directly in the path of movement of the vehicle.

Another object of this invention is the production of a dirigible headlight wherein efficient means are employed for supporting the lamps and also connecting the posts which support the lamps to the rod connecting the steering knuckles of the automobile or motor vehicle.

Another object of this invention is the production of a dirigible headlight wherein efficient means are employed for holding the lamp post against vibration and steadily retaining the same upon their proper supports although with means of a yieldable nature to allow the posts to slightly spring if necessary.

One practical form of construction and assembly of the present invention will be hereinafter described and is illustrated in the drawing, in which Figure 1 is a front elevation, partly in section of the dirigible headlight connection.

Figure 2 is a front elevation of a portion of the device. Figure 3 is a top plan view partly in section of the construction.

Figure 4 is a fragmentary plan view of a part of the device as will be hereinafter defined.

In the preferred embodiment of the present invention, about to be specifically described, 5 indicates a portion of a motor vehicle body having a bracket extension projecting therefrom, which is provided with a collar 7 upon its outer end. Although as illustrated only one bracket is disclosed, it is obvious that the device is to be connected to the usual two lamps at the forward end of the motor vehicle.

Each lamp post is preferably cylindrical and passes through a collar 7 as shown clearly in Figure 1. This lamp post 8 has a bearing flange 9 integral thereon and above which the post is bent forwardly to provide an externally threaded horizontally extending end portion 10 carrying a collar 11. The lamp yoke 12 has a stem 13 passing through the collar 11 being retained against downward movement by a supporting flange 14. This stem may be wedged within the collar in any desired manner so as to be swung as the lamp post 8 is turned.

The flanged bearings 15 are inserted into the collar 7 it being noted that the inner ends of the bearings are spaced apart while their flanged ends bear upon the edges of the collar as illustrated. Thus the flange 9 will engage the upper flanged bearing 15 to cause the lamp post to be efficiently supported.

The portion of the lamp post 8 below the collar 7 is externally threaded as shown at 8'. A pair of bearing washers 16 are positioned upon this portion of the post 8 while a helical spring 17 surrounds this threaded portion 8' bearing at its ends upon the bearing washer 16. One washer will therefore be held in engagement with the lower flanged bearing 15, causing this bearing to be held in a binding engagement with the collar 17, while the lower bearing washer will be held in engagement with a nut 18 carried upon the threaded end 8' of the post 8. It is obvious that by the adjustment of the nut 18, the tension of the spring 17 may be regulated.

A collar 19 is positioned upon the lower end of the post 8 below the nut 18 being keyed to the post by a set screw 20. A jam nut 21 is also carried upon the lower end of this post and thus positively prevents displacement of the collar 19. A crank arm 22 having offset ends, is screwed into engagement with the collar 19, while its opposite end is held in engagement by a pivot 23 with the yoke 24 of a sleeve 25. As above pointed out, these connections are provided for each lamp and for this reason the two sleeves 25 are connected together by a cross rod 26. In order to connect the cross rod 26 with the steering rod 27, a sleeve 28 is fixed upon the rod 26 and is provided with a pin 29 which receives the yoke 30. The yoke 30 is carried by a sleeve 32. This sleeve is connected to the link 33 having a sleeve 34 at its opposite end having a yoke 35 pivoted on the ear 36 of the clamp 37 as shown at 38. This clamp 37 is received by the steering rod 27 and is provided with a bolt 39 clamping the same in position. The device is assembled as above specified and when in use it will be seen that it is always in condition for proper operation. When the automobile or motor vehicle is moving in a straight course the rays of light projected from lamps carried by the yokes 12 will be thrown directly in front of the motor vehicle, that is the path of movement thereof. When however the motor vehicle changes from its straight course as when turning a corner, it is necessary to shift the wheels to steer the motor vehicle, this being accomplished by movement of the steering rod 27. When this rod moves it will of course shift the clamps 37 whereby through these several connections the link 33 will be shifted to one side, causing simultaneous and like movement of the rod 26. As this rod 26 is shifted it will swing the crank arms 22, thus causing the lamp posts to pivot upon their supports. As these lamp posts pivot, it is obvious the upper ends thereof will also turn the lamp yoke, due to their connections therewith as specified whereby the lamps will be turned to cause rays of light projecting therefrom to be directed in the path of movement of the motor vehicle. It will therefore be seen that all movement of the steering rod 27 in steering the vehicle will produce simultaneous and proper movement on the part of the lamp yokes for steering the lamps.

Although the tension of the spring 17 will hold its lamp post in a firm seated engagement upon the flanged bearings and the supporting collar 7, it should be understood that in the event the motor vehicle passes over uneven surfaces and is shaken considerably, the lamp posts may move upwardly for slight distances passing through the flanged bearings, for under such conditions the lower ends of the lamp posts will draw upon the nuts 18 and thus compress the springs, which springs will tend to resist such action. Thus a cushion like support is provided for the lamp posts which will tend to absorb all undue shocks and vibrations whereby injury to the lamp posts and the several connections is eliminated which would not be the case if the posts were fixed upon the vehicle body in such manner as to prevent such action, for under such conditions the strain would be imparted to the several connections which would tend to weaken or loosen the same if not actually to break or displace them. Movement of the posts as specified is permitted due to the pivotal connections of the crank arms to the rod 26 and the connection of the rod 26 to the link 33 and this link to the steering rod 27, so that even though the lamp post may be moving vertically to allow the undue shocks to be absorbed nevertheless, the connections will still be positive so that a shifting of the rod 27 will cause the lamps to be properly turned to direct rays of light therefrom directly in the path of movement of the motor vehicle.

It will be understood that the several connections are strong and the connections are comparatively simple so that although the device may be cheaply produced nevertheless the simplicity of construction will insure of efficient operation at all times.

The foregoing description and drawing has reference to the preferred or approved form of my invention. It is to be understood however, that I may make such changes in construction and assembly of parts, materials, dimensions, et cetera, as may prove expedient and fall within the scope of the appended claim.

Having thus fully described my invention, what I claim as new and desire to secure by Letters Patent is:

In a dirigible headlight, a bracket having a vertically disposed collar thereon, a post mounted in said collar, an annular stop flange formed on the post above the collar, oppositely disposed flanged bearing sleeves disposed in the collar against said post, the flanges of the bearing sleeves engaging the upper and lower ends of the collar, washers disposed on the post below the collar, an expansion spring coiled about the post between the washers, a crank arm connected to the post at the lower end thereof, and an adjustable nut threaded upon said post and engaging the lowermost washer.

In testimony whereof I affix my signature in presence of two witnesses.

CHARLES H. FISHER.

Witnesses:
EMMETT Q. FISHER,
MARY SMITH.